(12) United States Patent
Muijzert

(10) Patent No.: US 9,304,216 B2
(45) Date of Patent: Apr. 5, 2016

(54) SEISMIC ACQUISITION SYSTEM AND TECHNIQUE

(75) Inventor: Everhard Johan Muijzert, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 859 days.

(21) Appl. No.: 12/366,449

(22) Filed: Feb. 5, 2009

(65) Prior Publication Data
US 2010/0195439 A1    Aug. 5, 2010

(51) Int. Cl.
| | |
|---|---|
| *G01V 1/38* | (2006.01) |
| *G01V 1/20* | (2006.01) |
| *G01V 1/18* | (2006.01) |
| *G01V 1/36* | (2006.01) |
| *G01V 1/30* | (2006.01) |
| *G01V 1/34* | (2006.01) |

(52) U.S. Cl.
CPC .. *G01V 1/20* (2013.01); *G01V 1/18* (2013.01); *G01V 1/36* (2013.01); *G01V 1/301* (2013.01); *G01V 1/34* (2013.01); *G01V 2210/57* (2013.01)

(58) Field of Classification Search
CPC ............ G01V 1/18; G01V 1/301; G01V 1/34
USPC ................... 367/15, 43, 45; 702/14
See application file for complete search history.

(56) References Cited

U.S. PATENT DOCUMENTS

| | | | |
|---|---|---|---|
| 3,252,339 A * | 5/1966 | Huang ........................... 74/5.6 D |
| 4,458,536 A * | 7/1984 | Ahn et al. ........................ 73/652 |
| 5,511,037 A * | 4/1996 | Randall et al. ................... 367/33 |
| 5,555,530 A * | 9/1996 | Meehan ........................... 367/45 |
| 5,723,790 A | 3/1998 | Andersson |
| 6,021,091 A | 2/2000 | Gaiser |
| 6,021,379 A * | 2/2000 | Duren et al. ..................... 702/16 |
| 6,076,045 A * | 6/2000 | Naville ........................... 702/10 |
| 6,519,205 B1 | 2/2003 | Baeten et al. |
| 6,553,315 B2 | 4/2003 | Kerekes et al. |
| 6,932,185 B2 | 8/2005 | Bary et al. |
| 7,286,442 B2 * | 10/2007 | Ray et al. ......................... 367/15 |
| 7,474,591 B2 * | 1/2009 | Menard et al. ................. 367/178 |
| 7,561,493 B2 | 7/2009 | Ray et al. |
| 7,656,746 B2 | 2/2010 | de Kok et al. |
| 7,676,327 B2 | 3/2010 | Ozdemir et al. |
| 7,773,457 B2 * | 8/2010 | Crice et al. ....................... 367/80 |
| 2005/0018537 A1 | 1/2005 | Welker et al. |
| 2006/0171253 A1 * | 8/2006 | Goujon et al. ................... 367/15 |
| 2006/0245300 A1 | 11/2006 | De Kok et al. |

(Continued)

FOREIGN PATENT DOCUMENTS

| | | |
|---|---|---|
| CN | 1707288 | 8/2010 |
| EP | 1674888 | 6/2006 |
| GB | 2456313 | 7/2009 |

(Continued)

OTHER PUBLICATIONS

Lawton, et al., Field Tests of 3-Component Geophones, Part II, CREWES Research Report, 1990, pp. 1-17, vol. 2.

(Continued)

*Primary Examiner* — Krystine Breier

(57) ABSTRACT

An apparatus includes an array of seismic sensor units that are adapted to acquire measurements in connection with a land surface-based seismic survey. Each seismic sensor unit includes a particle motion sensor and a rotation sensor.

10 Claims, 9 Drawing Sheets

(56) References Cited

U.S. PATENT DOCUMENTS

2008/0291779 A1* 11/2008 Muyzert et al. ............ 367/20
2010/0211323 A1  8/2010 Ozdemir et al.

FOREIGN PATENT DOCUMENTS

RU    28923    4/2003
RU    2229146  5/2004

OTHER PUBLICATIONS

Kragh, et al., Ground Roll and Polarization, First Break, Sep. 1995, vol. 13, No. 9.
Robertsson, et al., Wavefield Separation using a Volume Distribution of Three Component Recordings, Geophysical Research Letters, Sep. 15, 1999, pp. 2821-2824, vol. 26, No. 18.
Yilmaz, Seismic Data Analysis: Processing, Inversion and Interpretation of Seismic Data, SEG, 2001.
Kappius, et al., Adaptive Vector Filters for Ground Roll Reduction, CSEG Geophysics, 2002, pp. 1-3.
Robertsson, et al., Wavefield Separation using Densely Deployed Three-Component Single-Sensor Groups in Land Surface-Seismic Recordings, Geophysics, Sep.-Oct. 2002, pp. 1624-1633, vol. 67, No. 5.
Anderson, et al., Point-Receiver Seismic Data offers New Approach to Managing Onshore E&P Development Cycle, First Break, Feb. 2006, pp. 63-69, vol. 24.
Igel, et al., Broad-band Observations of Earthquake-Induced Rotational Ground Motions, Geophysical Journal International, 2007, pp. 182-196, vol. 168.
Ozdemir, et al, Interpolation of Irregularly Sampled Data by Matching Pursuit, EAGE 70th Conference and Exhibition, Jun. 2008.
International Search Report, Sep. 10, 2010, PCT/US2010/022477.
Grant Notice of Russian Application No. 2011136642 dated Feb. 24, 2014: pp. 1-7.
Extended European Search Report of European Application No. 10738987.6 dated Mar. 28, 2014: pp. 1-7.
Official Action of Russian Application No. 2011136642 dated Nov. 22, 2013: pp. 1-7.
Butzer, et al, "Chapter 2: An introduction to sampling analysis," in "Nonuniform Sampling Theory and Practice".
Butzer, et al, "Chapter 2: An introduction to sampling analysis," in Nonuniform Sampling Theory and Practice, edited by Farokh Marvasti, Springer Science + Business Media, LLC 2001.
Examination Report issued in related GCC application No. 2010-15224 mailed Dec. 7, 2015.

* cited by examiner

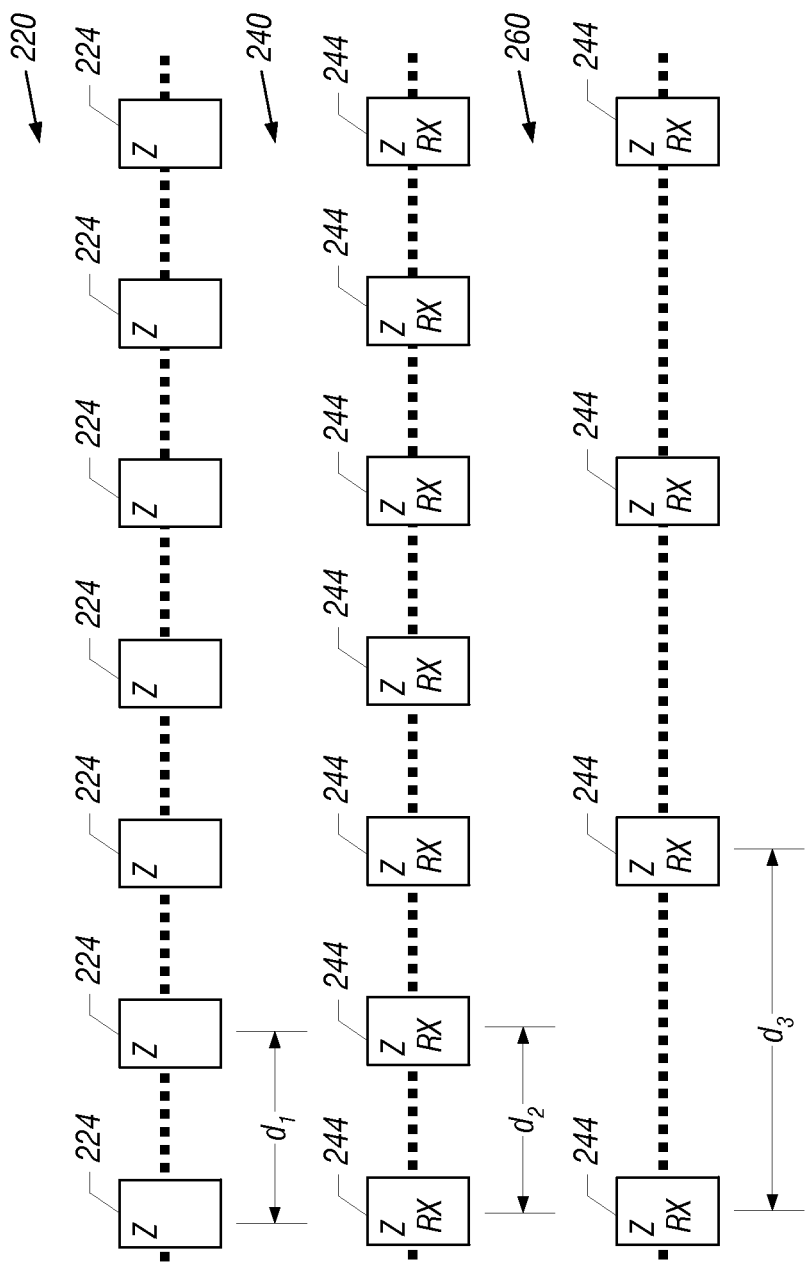

SEISMIC ACQUISITION SYSTEM AND TECHNIQUE

BACKGROUND

The invention generally relates to seismic acquisition system and technique.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. In response to the detected seismic events, the sensors generate electrical signals to produce seismic data. Analysis of the seismic data can then indicate the presence or absence of probable locations of hydrocarbon deposits.

SUMMARY

In an embodiment of the invention, an apparatus includes an array of seismic sensor units that are adapted to acquire measurements in connection with a land surface-based seismic survey. Each seismic sensor unit includes a particle motion sensor and a rotation sensor.

In another embodiment of the invention, a technique includes receiving particle motion and rotation rate data from an array of seismic sensors. The technique includes processing the data to determine a subsurface image.

Advantages and other features of the invention will become apparent from the following drawing, description and claims.

BRIEF DESCRIPTION OF THE DRAWING

FIGS. 3 and 6 illustrate seismic sensor arrays of the prior art.

FIGS. 4, 5, 7, 8 and 9 are illustrations of seismic arrays according to embodiments of the invention.

DETAILED DESCRIPTION

A land surface-based seismic survey (herein called a "land seismic survey") typically is conducted for purposes of imaging the subsurface for hydrocarbon exploration, production and monitoring. In this survey, an active seismic source emits energy, which reflects off of subsurface reflectors. The reflected energy is sensed to produce raw seismic data, which is further processed to image the subsurface. The active seismic source may be an impulse-type source (an explosive, for example) or a vibrating source.

Figure 1:
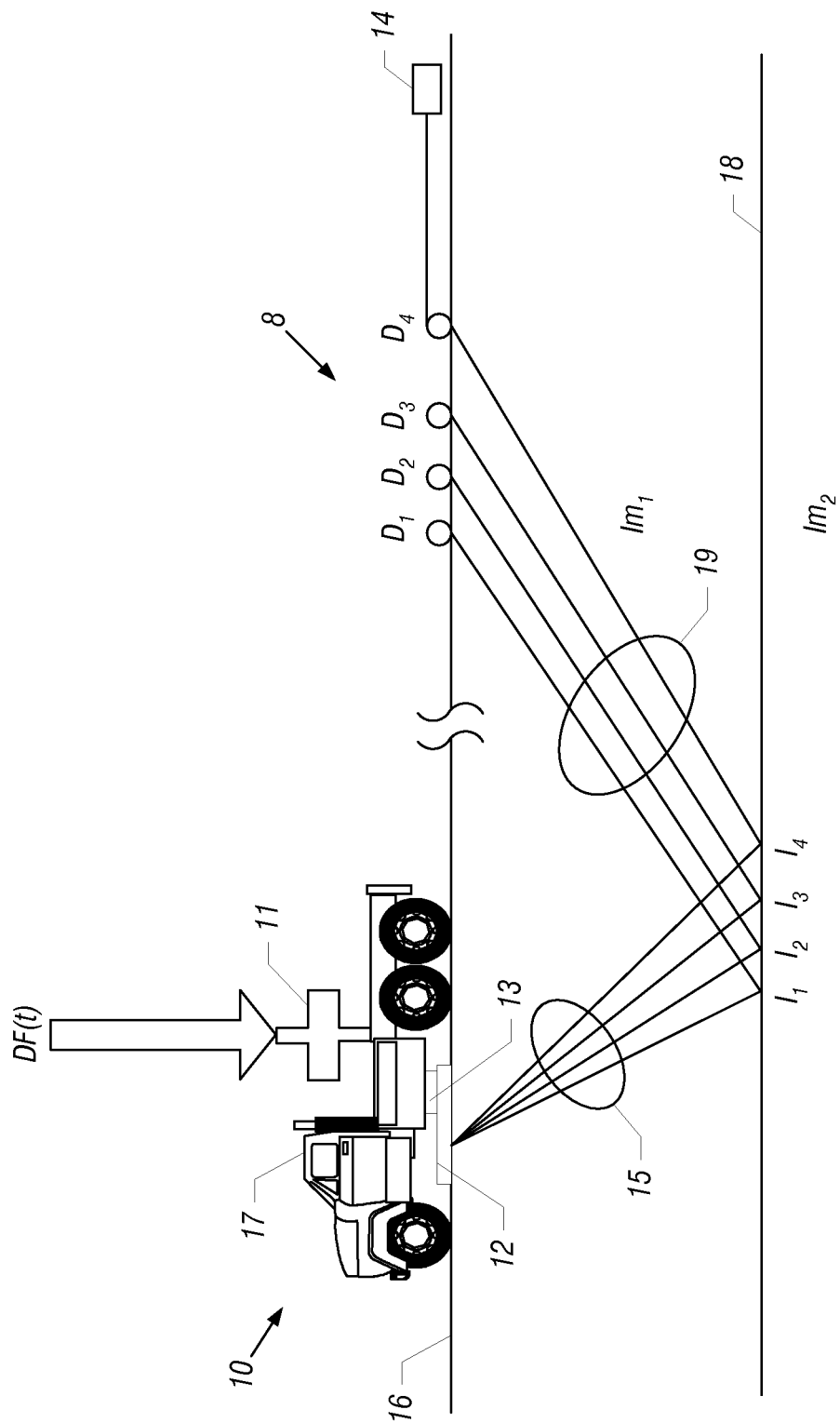
FIG. 1 is a schematic diagram of a vibroseis acquisition system according to an embodiment of the invention.

As a more specific example, FIG. 1 depicts a vibroseis acquisition system 8 in accordance with embodiments of the invention. The system may one seismic vibrator 10 (as depicted in FIG. 1) or multiple seismic vibrators; an array of surface-located seismic sensor units $D_1$, $D_2$, $D_3$ and $D_4$; and a data acquisition system 14. As part of operations associated with a vibroseis survey, the seismic vibrator 10 generates at least one vibroseis seismic sweep. More specifically, FIG. 1 depicts a subsurface sweep signal 15 that is generated by the vibrator 10 during the survey for purposes of injecting a vibroseis sweep into the earth. An interface 18 between subsurface impedances $Im_1$ and $Im_2$ reflects the signal 15 at points $I_1$, $I_2$, $I_3$ and $I_4$ to produce a reflected signal 19 that is detected by seismic sensor units $D_1$, $D_2$, $D_3$ and $D_4$, respectively. The data acquisition system 14 gathers the raw seismic data acquired by the seismic sensor units $D_1$, $D_2$, $D_3$ and $D_4$; and the raw seismic data is processed to yield information about subsurface reflectors and the physical properties of subsurface formations.

For purposes of generating the signal 15, the seismic vibrator 10 may contain an actuator (a hydraulic or electromagnetic actuator, as examples) that drives a vibrating element 11 in response to a sweep pilot signal (called "DF(t)" in FIG. 1). More specifically, the DF(t) signal may be a sinusoid whose amplitude and frequency are changed during the generation of the sweep. Because the vibrating element 11 is coupled to a base plate 12 that is in contact with the earth surface 16, the energy from the element 11 is coupled to the earth to produce the signal 15. Among its other features, the seismic vibrator 10 may also include a signal measuring apparatus 13, which includes sensors (accelerometers, for example) to measure the signal 15 (i.e., to measure the output ground force of the seismic vibrator 10). As depicted in FIG. 1, the seismic vibrator 10 may be mounted on a truck 17, an arrangement that enhances the vibrator's mobility.

It is noted that unlike the seismic vibrator 10, a seismic vibrator may alternatively be constructed to be located in a borehole, in accordance with other embodiments of the invention. Furthermore, the seismic sensor units may alternatively be disposed in a borehole to record measurements produced by energy that is injected by borehole-disposed vibrators. Although specific examples of surface-located seismic sources and seismic sensor units are described herein, it is understood that the seismic sensor units and/or the seismic sources may be located downhole in accordance with other embodiments of the invention. It is also noted that although a seismic vibrator is depicted in FIG. 1 as the seismic source, another type of seismic source (an impulse-type source, for example) may be used in accordance with other embodiments of the invention.

Conventionally, the seismic sensor units may contain particle motion sensors, such as geophones, which record the translational part of the elastic wavefield. This wavefield that is dominated by slowly propagating ground roll, which masks the weaker near vertical propagating reflections from the subsurface hydrocarbon reservoirs. To attenuate the sensed ground roll, dip or velocity fillers may be applied to the data acquired by the particle motion sensors. In order to avoid spatial aliasing, this technique has traditionally required at least two geophones per slowest wavelength in the source receiver direction. Additional geophones in the crossline direction have also been traditionally used to attenuate scattered seismic energy. For slightly aliased data, the geophones may be spaced apart at approximately 1.5 sensors per wavelength.

Alternatively, conventional seismic sensor units may sense particle motions along three orthogonal axes, which allows polarization filtering (instead of the dip or velocity filtering) to be applied. Polarization filtering typically relies on the ninety degree phase shift between the horizontal and vertical component of the Rayleigh wave part of the ground roll. An advantage of polarization filtering is that the particle motion sensor stations may be spaced farther apart, as the minimum required spatial sampling now depends on the faster seismic reflections because the more slowly propagating ground-roll is locally attenuated. However, polarization filtering typically yields poorer results than the technique of using velocity filtering with more densely-spaced particle motion sensors.

Figure 2:
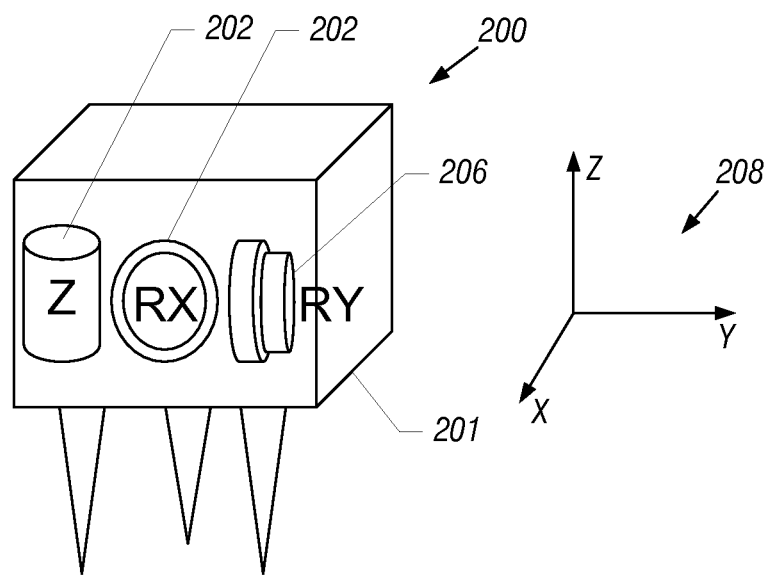
FIG. 2 is an illustration of a seismic sensor unit that includes a geophone and two rotation sensors according to an embodiment of the invention.

Referring to FIG. 2, in accordance with embodiments of the invention described herein, velocity or dip filtering may be applied to data acquired by an array of seismic sensor units 200 (one seismic sensor unit 200 being depicted in FIG. 2) to attenuate noise attributable to ground roll. However, the seismic sensor units 200 may be spaced further apart than conventional seismic sensor units, while still avoiding spatial aliasing. In accordance with embodiments of the invention, each seismic sensor unit 200 includes a particle motion sensor, such as a geophone 202, which is used to measure a particle motion along a vertical (z) (see axes 208); and at least one sensor that is constructed to measure a rate of rotation about a horizontal axis. For the particular example depicted in FIG. 2, the seismic sensor unit 200 includes a geophone 202 that is oriented to sense, or measure, a particle velocity along the vertical, or z axis; a rotation sensor 204, which is oriented to measure a crossline rate of rotation about the inline, or x, axis; and a rotation sensor 206, which is oriented to measure an inline rate of rotation about the crossline, or y, axis. In accordance with some embodiments of the invention, the sensors 202, 204 and 206 may be disposed in the same package 201.

It is noted that FIG. 2 is merely one out of many possible embodiments of a seismic sensor unit in accordance with the invention. For example, in other embodiments of the invention, for a two-dimensional (2-D) spatial array, the seismic sensor unit may include a particle motion sensor and a single rotation sensor. As another variation, the sensors of the seismic sensor unit may be generally co-located but disposed in separate packages. For example, in accordance with some embodiments of the invention, the particle motion sensor 202 may be physically detached from the rotation sensors 204 and 206 and connected to the sensors through wired or wireless connections. Thus, many variations are contemplated and are within the scope of the appended claims.

As non-limiting examples, for surface and shallow depth applications, the rotation sensor 204, 206 may be an Eentec R-1 tri-axial rotational sensor, which is manufactured by Eentec of St. Louis, Mo. As another example, the rotation sensor 204, 206 may be formed from a Sagnac interferometer and a gyroscope. Other variations are contemplated in other embodiments of the invention.

It is noted that FIG. 2 depicts only the sensors 202, 204 and 206 of the seismic sensor unit 200 and has been simplified for purposes of clarifying the types of sensors present in the unit 200. However, the seismic sensor unit 200 may include other components, such as amplifiers and other electronic circuitry for purposes of acquiring seismic data. For example, the seismic sensor unit 200 may include circuitry to scale the data that are acquired by the sensors 202, 204 and 206 for purposes of compensating for individual sensor responses. This scaling may be frequency dependent to compensate for differences in amplitude and phase sensitivity. It is noted that the scaling may alternatively be carried out in a recording unit or may be performed later during data processing.

Due to the inclusion of at least one rotation sensor in the seismic sensor unit 200, the seismic sensor units may be spaced further apart, as compared to the spacing used with conventional seismic sensor units. More specifically, the rotation sensors 204 and 206 generate signals, which are indicative of horizontal rotation rates about their respective axes. This measured horizontal rotation rate when measured at the surface is proportional to the tilt rate. The tilt rate, for small values, is proportional to the spatial derivative of the vertical velocity of the surface. Therefore, a measurement of the horizontal rotation rate at the surface is proportional to the spatial derivative of the vertical velocity, which permits the use of the multiple channel sampling theorem for the spatial interpolation of the measured seismic wavefield at points other than the locations of the seismic sensor units.

In general, pursuant to the multiple channel sampling theorem, a function and its derivative may be interpolated exactly when the function and its derivative are sampled at a spacing of at least one wavelength. The recorded velocity V(t) and its spatial derivative $\partial V(t)/\partial x$ are sampled uniformly at $t=2k\pi/\Omega$ and may be reconstructed as described below:

$$V(t) = \sum_{k=-\infty}^{\infty} V\left(\frac{2k\pi}{\Omega}\right) + \left(t - \frac{2k\pi}{\Omega}\right)\frac{\partial V}{\partial x}\left(\frac{2k\pi}{\Omega}\right)\left[\operatorname{sinc}\frac{1}{2}\left(\frac{\Omega t}{\pi} - 2k\right)\right]^2 (t \in R, k \in Z). \quad \text{Eq. 1}$$

Referring to FIG. 3, a conventional seismic sensor one-dimensional (1-D) spatial array 220 has geophones 224, which are spaced apart pursuant to a spacing (represented by a spacing distance "$d_1$" in FIG. 3) of two geophones 224 per the slowest significant wavelength of the ground roll. Referring also to FIG. 4, in accordance with some embodiments of the invention, a seismic 1-D spatial array 240 may be formed from seismic sensor units 244, which each contain a particle motion sensor and at least one rotation sensor. Comparing FIGS. 3 and 4, in accordance with some embodiments of the invention, the seismic sensor units 244 may have a spacing (represented by a spacing distance "$d_2$" in FIG. 4), which is approximately the same as the spacing of the array 220. However, due to the multiple channel sampling theorem, much better quality data are acquired by the array 240 because of the rotation rate data. To achieve the same data quality as the array 200, a 1-D spatial array 260, depicted in FIG. 5, may alternatively be used in accordance with other embodiments of the invention. Comparing FIGS. 3, 4 and 5, the seismic sensor units 244 of the array 260 are spaced apart by a larger spacing distance (called "$d_3$" in FIG. 5), which is significantly larger than the spacing distance $d_1$ or $d_2$. In particular, in accordance with embodiments of the invention, the spacing distance $d_3$ may be as much as one wavelength of the slowest significant sensed velocity.

Thus, using the multiple channel sampling theorem, the recorded vertical velocity wavefield may be interpolated at any point between two seismic sensor units up to a the slowest significant wavelength of the ground roll apart. For 2-D arrays, a similar reduction in the crossline direction may be achieved, although often the crossline sampling is already sparser than the inline sampling. As a result, 2-D arrays as used in 3-D time lapse seismic (where time is the third dimension) may use up to four times fewer seismic sensor units than conventional arrays while maintaining the same data quality.

This potentially leads to a significant reduction in field deployment. For this case, the number of channels does not scale in the same way and a reduction of 4/3 in channels may be achieved.

For slightly aliased data, the seismic sensor units (each including at least one particle motion sensor and at least one rotation sensor) may be spaced apart at approximately 0.75 per shortest wavelength, as compared to a spacing of 1.5 per wavelength in convention arrangements in which slightly aliased data are acquired.

The multiple channel interpolation theorem expressed in Eq. 1 applies to an infinite number of regularly-spaced seismic sensor units. Without a significant loss of accuracy, the number of sensor units may be limited to a sufficiently small number (64, as a non-limiting example). For the interpolation of a smaller number of seismic sensor units and/or irregularly-spaced seismic sensor units, a technique such as the one described in Ozbek, A., Ozdemir, A. K., and M Vassallo, *Interpolation of Irregularly Sampled Data by Matching Pursuit*, European Association of Geoscientists & Engineers, Expanded Abstracts (2008), may be applied. For interpolation in two spatial dimensions, the data may first be interpolated in one direction using the one dimensional algorithm and next interpolated in the other direction using the same one dimensional algorithm.

Figure 6:
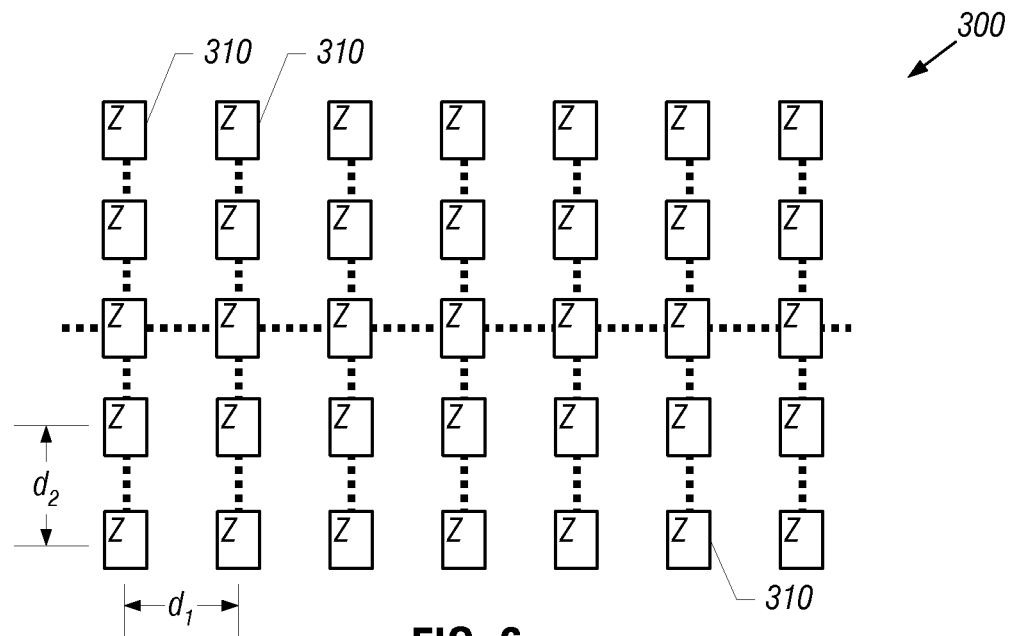
Figure 7:
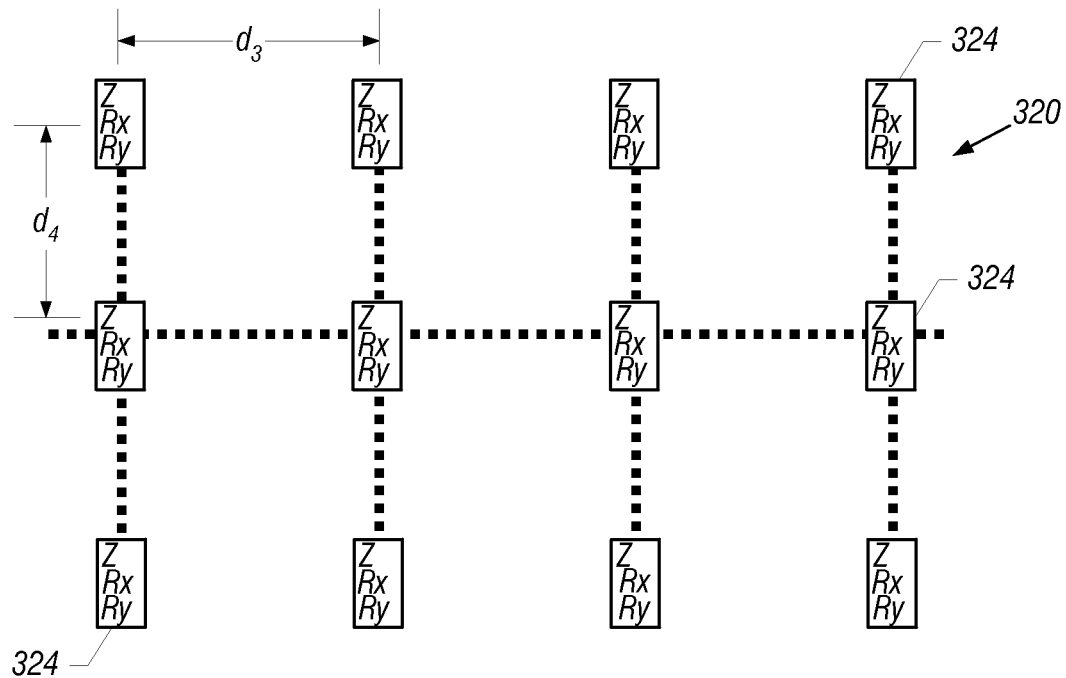

FIG. 6 depicts a conventional 2-D spatial array of seismic units 310, each including only geophones. In general, the array 300 may have an inline spacing distance (called "$d_1$" in FIG. 6) and a crossline spacing distance (called "$d_2$" in FIG. 6), such that the geophones are separated by one half wavelength apart. The array 300 is to be contrasted to an alternative array 320 (see FIG. 7) that may be constructed using in accordance with embodiments of the invention described herein. The array 320 includes seismic sensor units 324, each including a particle motion sensor and two rotation sensors. The array 320 has an inline spacing distance (called "$d_3$" in FIG. 7) and a crossline spacing distance (called "$d_4$" in FIG. 7), which are significantly larger than the spacing distances $d_1$ and $d_2$ used in the array 300 of FIG. 6. In particular, the spacing distances $d_3$ and $d_4$ may be approximately one wavelength of the slowest significant sensed. Thus, the sensor spacing is doubled in both horizontal directions for the array 320, as compared to the conventional array 300. Therefore, the array 320 has four times less seismic sensor units than the conventional array 300, which significantly reduces the number of cables and field deployment effort.

Figure 8:
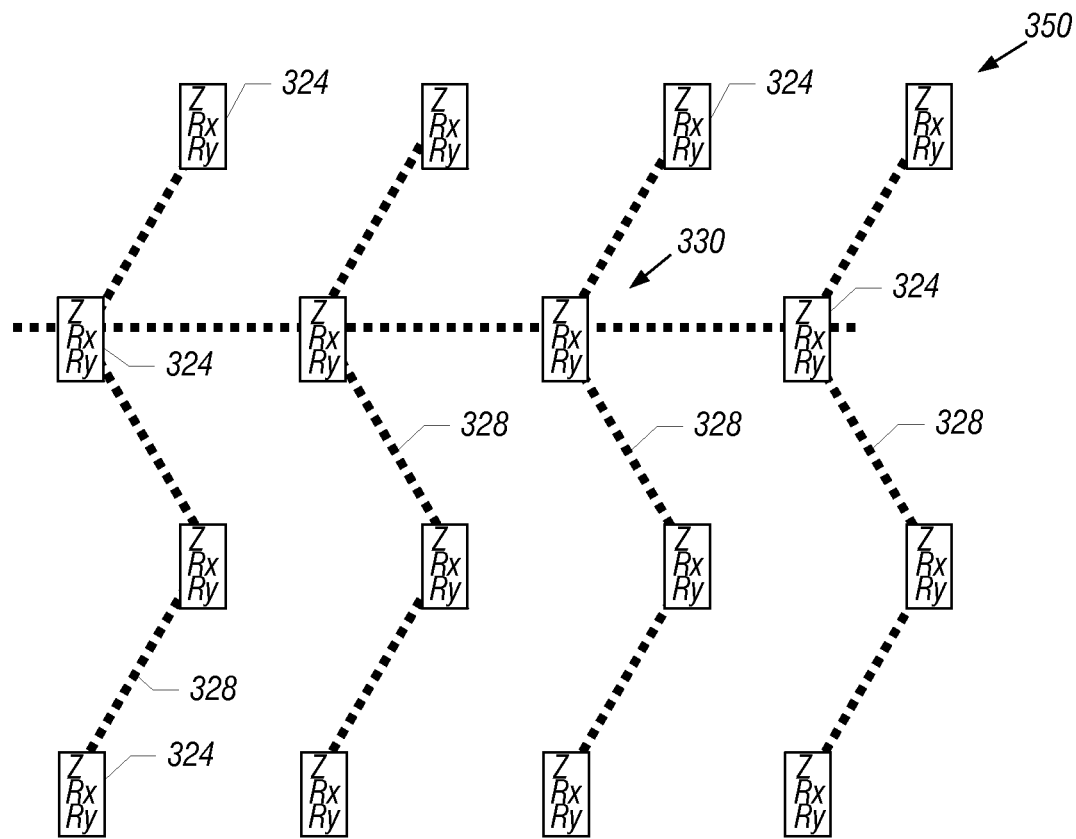

It is noted that the seismic sensor units of the array may not be uniformly spaced apart in a rectangular grid, in accordance with other embodiments of the invention. For example, FIG. 8 depicts an array 350 of seismic sensor units 324 in accordance with other embodiments of the invention. As shown, the array 350 includes an inline path 330 and crossline paths 328, which are each arranged in a staggered, or hexagonal, configuration.

Due to the increased spacing between the seismic sensor units described herein, the seismic sensor units may be particularly advantageous for surveys conducted in areas that have obstructions. For conventional arrays, these obstructions may prevent the required two sensor unit per wavelength spacing for continuous interpolation. However, due to the larger spacing permitted by the seismic sensor units described herein, relatively large obstructions may be present without disturbing the resulting survey image.

Figure 9:
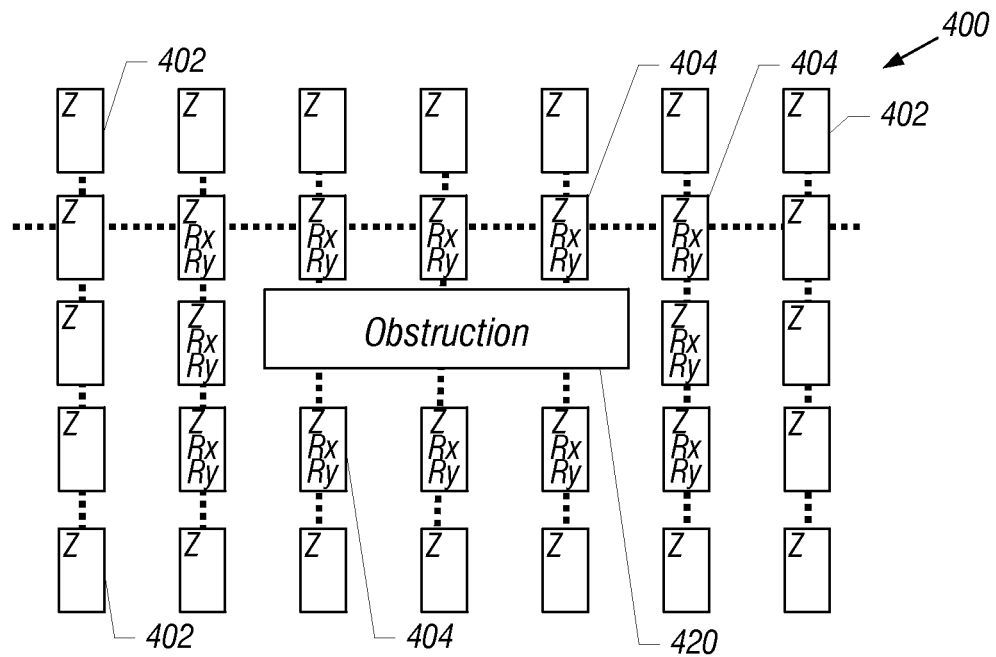

More specifically, referring to FIG. 9, in accordance with some embodiments of the invention, an array 400 may include both geophone only seismic sensor units 402 (i.e., units having no rotation sensors) and seismic sensor units 404, which each includes a geophone and at least one rotation sensor. As depicted in FIG. 9, the seismic sensor units 404 that include the rotation sensors are located in the vicinity of an obstruction 420. Due to the larger permitted spacing of the seismic sensor units 404, the obstruction 420 does not disrupt the survey geometry, and thus, continuous interpolation may still be achieved. As depicted in FIG. 9, which does not have the rotational sensors, the seismic sensor units 402 are generally located in regions which are away from the obstruction 420. Other variations are contemplated and are within the scope of the appended claims.

Figure 10:
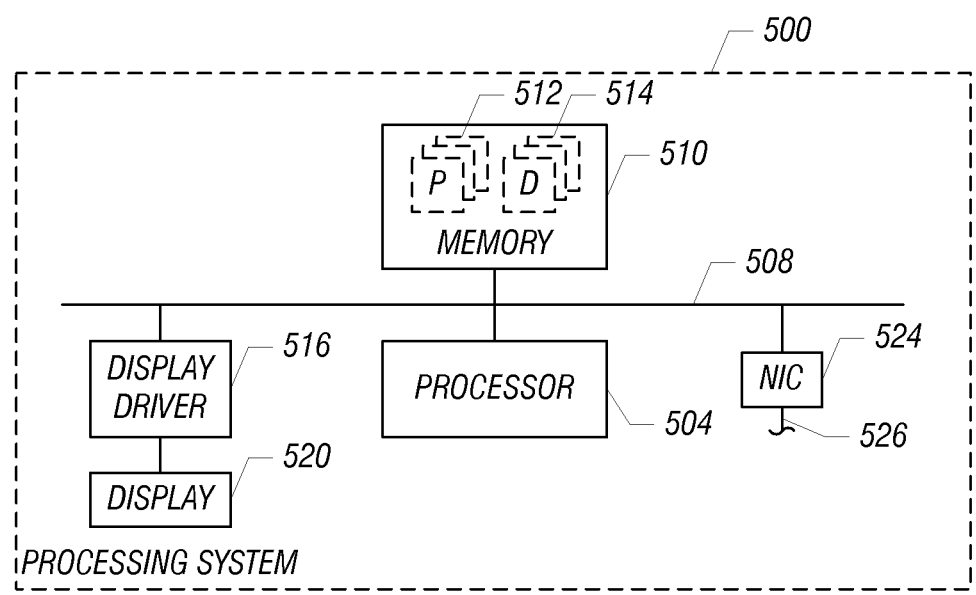
FIG. 10 is a schematic diagram of a data processing system according to an embodiment of the invention.

Referring to FIG. 10, in accordance with some embodiments of the invention, the seismic data that are acquired by the seismic sensor units that are described herein may be processed by a processing system 500. The processing system 500 may be entirely or partially located on the array or off the array, depending on the particular embodiment of invention. In general, the processing system 500 may include at least one processor 504, such as a microcontroller and/or microprocessor. In general, the processor 504 may be coupled through one or more buses 508 to a memory 510, which stores various programs 512 and datasets 514. The programs 512 may, when executed by the processor 504, cause the processor 504 to receive data acquired by the rotation and particle motion sensors of the seismic sensor units; apply multiple channel sampling to interpolate particle motion measurements in between sensor unit locations based on the received data; apply velocity or dip filtering; process the interpolated/actual particle motion and rotation rate measurements to determine a subsurface image; etc. Initial, intermediate, or final processing results may be stored as the datasets 514 in the memory 510.

It is noted that FIG. 10 depicts merely an example of one out of many possible architectures for the processing system 500. Thus, many variations are contemplated and are within the scope of the appended claims. For example, in accordance with other embodiments of the invention, the processing system 500 may be a distributed processing system and thus, may include processing subsystems that are connected together and may be located in different locations.

For the processing system 500 that is depicted in FIG. 10, the processing system 500 may include a display driver 516 that drives a display 520 for purposes of displaying the results of the processing by the processor 504. As examples, the display 520 may display time and/or frequency spectra of the acquired seismic measurements, as well as time and/or frequency spectra of the measurements after the multiple channel sampling, dip filtering, velocity filtering, etc. has been performed. Additionally, as depicted in FIG. 10, the processing system 500 may include interfaces to communicate with other computer and/or processing systems, such as a network interface card (NIC) 524, which is connected to a network 526.

A relatively small scale field test was performed using an Eentec R1 rotation sensor having an extended bandwidth of 50 Hertz (Hz). The rotation sensor and two surrounding vertical component geophones were deployed at the surface. A walkaway shot line was acquired with 2 meter (m) source spacing. For this test, the source was a vertical hammer, which impacted a metal plate on the ground. The rotation rate data, which is proportional to the spatial gradient of the wavefield was compared to the inline gradient of the vertical component of the velocity wavefield obtained through differencing a pair of vertical component geophones. The geophone and rotation data were corrected for their respective instrument responses.

Figure 11:
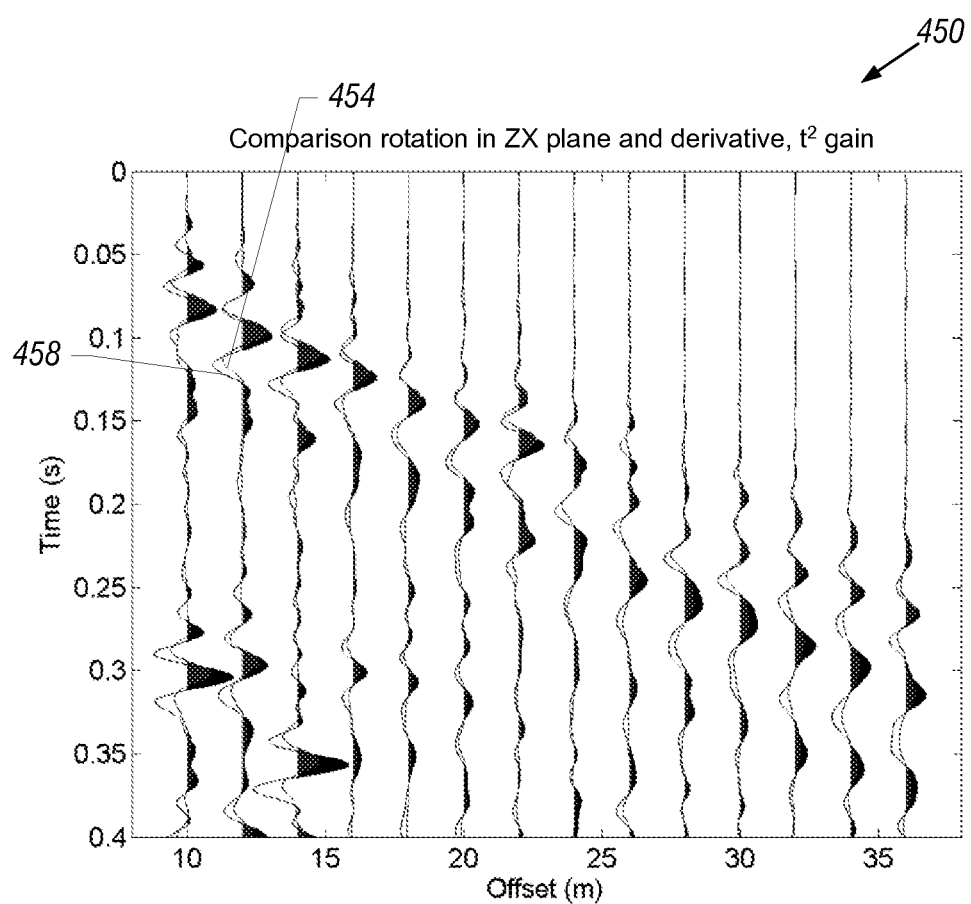
FIG. 11 depicts a field test depicting measured and calculated vertical velocity gradients according to an embodiment of the invention.

The results are depicted in FIG. 11 in a graph 450. Referring to FIG. 11, a comparison of the measured spatial gradient 458 (via the rotation sensor) and the calculated inline gradient 454 reveals a close agreement between the two datasets, such as close agreements in the arrival times and waveform shapes.

Other embodiments are contemplated and are within the scope of the appended claims. For example, in accordance with other embodiments of the invention, the particle motion and rotation data may be processed to obtain information about a wavefield other than interpolated values for the wavefield at the sensor unit locations. For example, in accordance with some embodiments of the invention, rotation sensor data may be used for purposes of attenuating the ground roll. The rotation sensor may be less sensitive in amplitude and/or frequency or may have, in general, a higher noise level than a rotation sensor used in the interpolation application. For this application, the rotation sensor records mainly the strong events, and the data is dominated by the ground roll. The rotation rate data may be combined with the particle motion data to attenuate the ground roll as described below.

In accordance with some embodiments of the invention, the rotation rate data is first combined with the particle motion data to interpolate the particle motion data at non-sensor unit locations, such as positions in the center between each set of sensor units, for example. Conventionally, the particle motion data is recorded at a spatial sampling interval of twice the spatial Nyquist wavenumber, as compared to this application in which the interpolated dataset is sampled at once the spatial Nyquist wavenumber. The interpolated dataset contains measured particle motion data with the weaker reflections and interpolated particle motion data without the weaker reflections. A ground-roll attenuation technique may then be applied, such as the frequency-wavenumber filtering technique (as a non-limiting example) described in Oz Yilmaz, *Seismic Data Analysis: Processing, Inversion and Interpretation of Seismic Data*, Society of Exploration Geophysicists (2001).

As another non-limiting example, a ground roll attenuation technique that is described in Anderson, B., P., Van Baaren, M. Daly, W. Grace, J. Quigley and D. Sweeney, *Point-Receiver Seismic Data Offers New Approach to Managing Onshore*, E&P Development Cycle, First Break, 24, no. 2, 63-70 (2006) may be used. After filtering, only a subset of the filtered measured particle motion traces are retained, as the filtered interpolated traces contain weaker reflections and thus, are discarded. Because this application aims at removing the ground roll noise and other noise modes only at wavenumbers between one and twice the spatial Nyquist wavenumber, a rotation sensor that has a limited sensitivity and frequency band may be used.

In accordance with other embodiments of the invention, the ground roll may be attenuated without first interpolating. One problem associated with ground roll is that its low velocity requires, in general, densely spaced particle motion sensors in the inline direction and also often in the crossline direction. When the wavefield is not properly spatially sampled, aliasing may produce challenges in many data processing algorithms. In general, aliasing occurs when less than two measurements are made of the shortest wavelength of interest. An anti-aliasing filter is described below, which removes the aliased part of the wavefield that, in many cases, is the relatively slower ground roll. By using the anti-aliasing filter, the sensor unit spacing may be increased, such that the ground roll is deliberately aliased, while the reflected signal is not.

The vertical component particle motion data (called "V(x,y,t)" herein) is measured at position (x,y) and time t. Due to one or more rotation sensors at each seismic sensor unit, an inline gradient (called "Gx(x,y,t)" herein) and/or the crossline gradient (called "Gy(x,y,t)" herein) of the vertical wavefield is also available. The wavefield measured at the surface may be described as follows:

$$V(x,y,t) = A(x,y,t)\exp(-ik_x x - ik_y y - i\omega t),$$ Eq. 2

$$G_x(x,y,t) = -ik_x A(x,y,t)\exp(-ik_x x - ik_y y - i\omega t), \text{ and}$$ Eq. 3

$$G_y(x,y,t) = -ik_y A(x,y,t)\exp(-ik_x x - ik_y y - i\omega t)$$ Eq. 4

In the frequency-wavenumber domain, the aliased energy with wavenumbers larger than the spatial wavenumber $k_n$ wraps around and is projected onto the unaliased frequencies/wavenumbers. The amplitude in the calculated frequency-wavenumber (f-k) spectrum may be described as follows:

$$V(f,k_x,k_y) = A_{ua}(f,k_x,k_y) + A_{alx}(f,k_x + k_n, k_y) + A_{aly}(f,k_x, k_y + k_n),$$ Eq. 5

$$G_x(f,k_x,k_y) = -ik_x A_{ua}(f,k_x,k_y) + i(k_x + k_n)A_{alx}(f,k_x + k_n, k_y) - ik_x A_{aly}(f,k_x, k_y + k_n), \text{ and}$$ Eq. 6

$$G_y(f,k_x,k_y) = -ik_y A_{ua}(f,k_x,k_y) + ik_y A_{alx}(f,k_x, k_y + k_n) - i(k)_y + k_n)A_{aly}(f,k_x, k_y + k_n),$$ Eq. 7 where "$A_{ua}$" represents the amplitude of the unaliased wavefield; "$A_{alx}$" represents the amplitude of the inline aliased wavefields; and "$A_{aly}$" represents the amplitude of the crossline aliased wavefield.

The amplitudes of the unaliased part of the f-k spectrum may be described as follows:

$$A_{unx}(f, k_x) = \left(\frac{k_x}{k_n} + 1\right)V(f, k_x) - \frac{1}{ik_n}G_x(f, k_x), \text{ and}$$ Eq. 8

$$A_{uny}(f, k_x) = \left(\frac{ky}{k_n} + 1\right)V(f, k_x) - \frac{1}{ik_n}G_y(f, k_y).$$ Eq. 9

Similarly, the amplitudes of the aliased part of the f-k spectrum may be described as follows:

$$A_{alx}(f, k_x) = \frac{k_x}{k_n}V(f, k_x) - \frac{1}{ik_n}G_x(f, k_x), \text{ and}$$ Eq. 10

$$A_{aly}(f, k_y) = \frac{k_y}{k_n}V(f, k_y) - \frac{1}{ik_n}G_y(f, k_y).$$ Eq. 11

Figure 12:
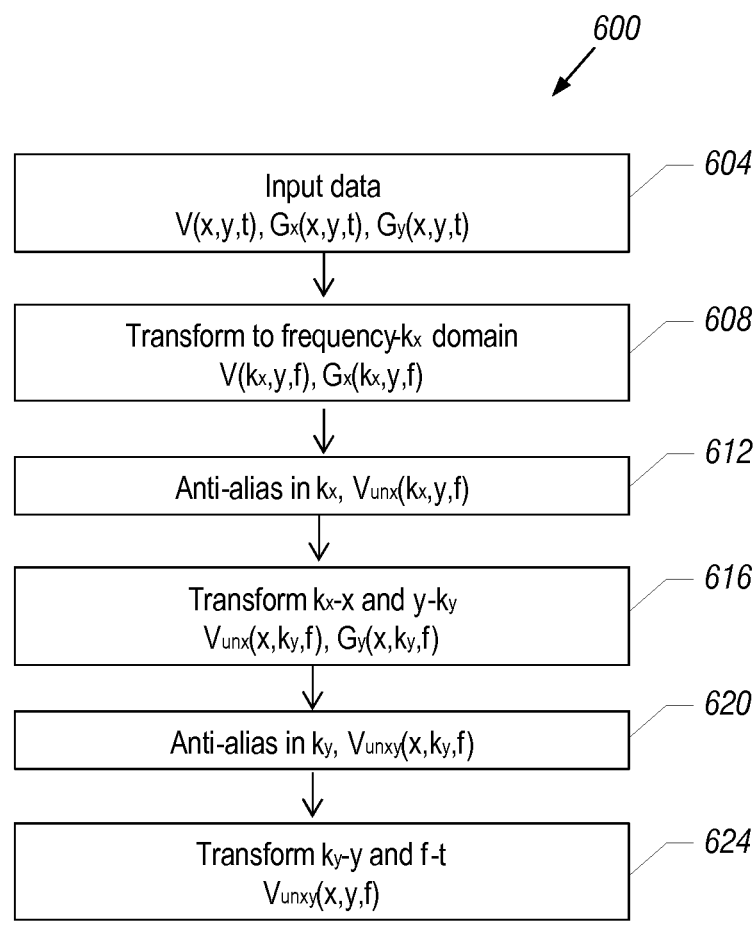
FIG. 12 is a flow diagram depicting a technique to attenuate ground roll according to an embodiment of the invention.

Thus, referring to FIG. 12, in accordance with an embodiment of the invention, a technique 600 may be applied for purposes of deriving an unaliased vertical particle motion wavefield. Pursuant to the technique 600, data that corresponds to the vertical particle motion data and the inline and/or crossline rotation data are received, pursuant to block 604. This data is then transformed, pursuant to block 608, into the frequency-$k_x$ domain, pursuant to block 608. An anti-aliasing filter is then applied in the x direction (block 612) and in the y direction (block 620). After the filtering in blocks 612 and 620, the filtered data is transformed, pursuant to blocks 616 and 624 back into the spatio-temporal domain.

In accordance with other embodiments of the invention, the rotation rate data may also be used for purposes of wavefield separation. More specifically, the rotation rate data may be used to separate the compression (P) and shear (S) wave modes at the free surface, as described in Robertsson, J. O. A., and A. Curtis, *Wavefield Separation Using Densely Deployed Three-Component Single-Sensor Groups in Land Surface-Seismic Recordings*, 1624-1633, Geophysics, Vol. 67 (2002). The compression P wavefield at the free surface is given by the divergence of the wavefield, as set forth below:

$$(\nabla \cdot \bar{v}) = \frac{2\mu}{\lambda + 2\mu}(\partial_x v_x + \partial_y v_y),\quad \text{Eq. 12}$$

where "λ" and "μ" are the Lame parameters. This term may be measured with the pressure sensor, as set forth in U.K Patent Application Serial No. 0800376.6, entitled, "ACOUSTIC LAND SEISMIC SENSOR", which was filed on Jan. 10, 2008, and is hereby incorporated by reference in its entirety. Alternatively, the term may be measured through spatial differencing of particle motion measurements, as described Robertsson, J. O. A., and E. Muyzert, *Wavefield Separation Using A Volume Distribution of Three Component Recordings*, Geoph. Res. Lett, 26, 2821-2824 (1999). The shear S wave part of the wavefield separation includes three components, which describe the curl of the wavefield as set forth below:

$$(\nabla \cdot \bar{v})_x = 2\partial_y v_z, \quad \text{Eq. 13}$$

$$(\nabla \cdot \bar{v})_y = 2\partial_x v_z, \text{ and} \quad \text{Eq. 14}$$

$$(\nabla \cdot \bar{v})_z = \partial_x v_y - \partial_y v_x, \quad \text{Eq. 15}$$

The terms in Eqs. 13-15 may be directly measured by a three component rotation rate sensor that is located at the free surface. Alternatively, a technique may be used for up-down wavefield separation using the measured rotation rate and three component velocities, as described in Geophysics 67 at 1624-1633 (in particular, Eqs. 28-36).

In other embodiments of the invention, the techniques and systems that are described herein may be applied to attenuate the airwave. In general, the airwave is the acoustic noise generated by the seismic source and propagates with a velocity around 330 m/s and has frequencies over 100 Hz. More specifically, the airwave may be attenuated using a technique, such as the technique described above for attenuating ground roll using an anti-aliasing filter. An important difference between the airwave and ground roll attenuations is that the airwave has a shorter wavelength and therefore is often aliased in conventional surveys. Seismic surveys with a combined particle motion and rotation rate sensor unit may therefore require unit spacing similar to conventional surveys and not at the sparser spacing as may otherwise be used for ground roll attenuation. However, still only one sensor unit per shortest wavelength may be used instead of two, but the shortest wavelength is now the higher frequency airwave and not the lower frequency ground roll.

Figure 13:
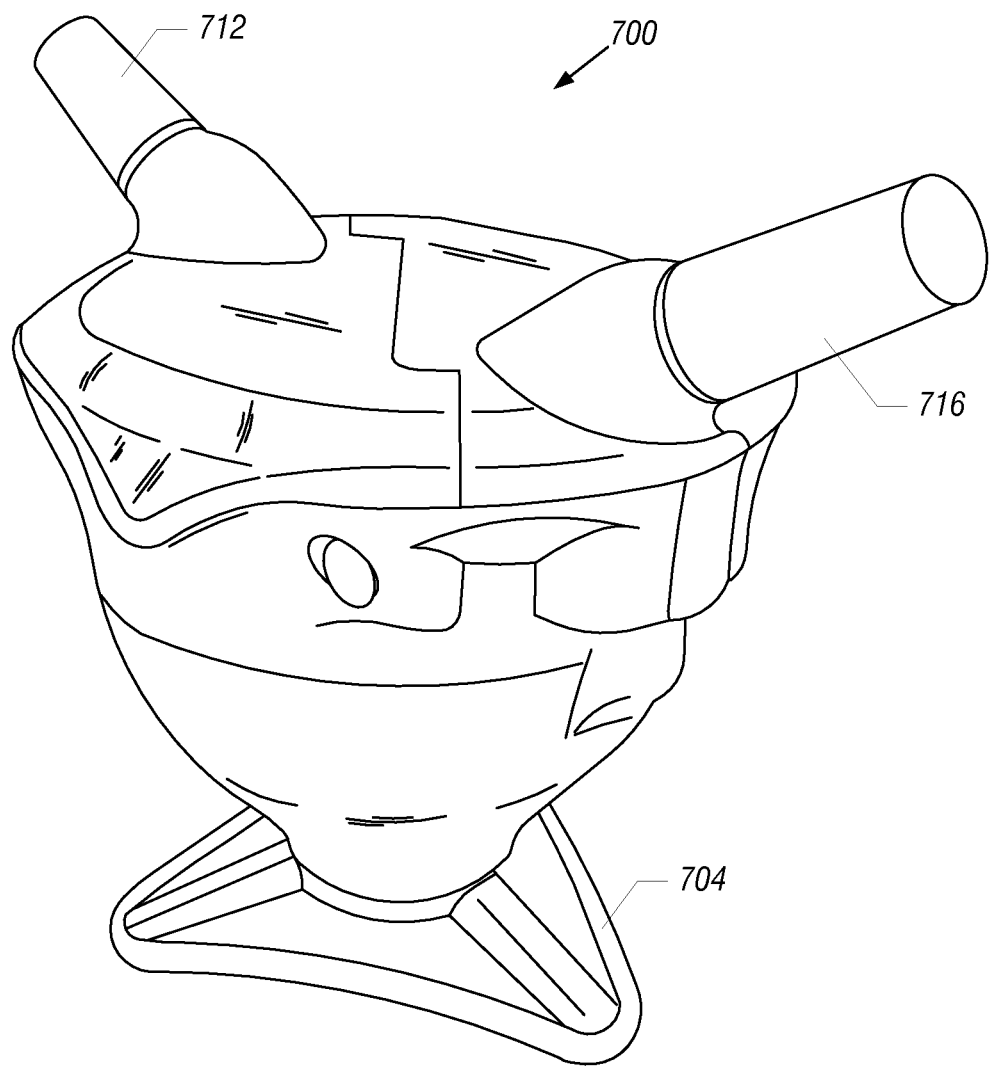
FIG. 13 is a perspective view of a seismic sensor unit according to an embodiment of the invention.

In accordance with some embodiments of the invention, a seismic sensor unit 700, which is depicted in FIG. 13, may be used. The seismic sensor unit 700 contains a geophone and at least one rotation sensor. The seismic sensor unit 700 has housing, which includes a base plate 704 that is slightly arched for purposes of stabilizing the unit 700 and, in general, enhancing the seismic coupling of the unit's sensors to the measured wavefield and ground roll. Cable connectors 712 and 716 are also depicted in FIG. 13. A single pin may or may not extend through the base plate 704 into the earth surface, depending on the particular embodiment of the invention.

In another variation, three pins may extend from a seismic sensor unit into the ground for purposes of stabilizing the unit and, in general, enhancing the coupling of the unit's sensors to the measured wavefield and ground roll. Other arrangements are contemplated and are within the scope of the appended claims.

It is noted that the processing system 400 may be used for purposes of processing the acquired particle motion and rotation rate data for purposes of performing the above-described ground roll attenuation, airwave attenuation, P and S wave separation, upgoing and downgoing wavefield separation, etc. Thus, the processing 400 may store corresponding datasets and program instructions for purposes of performing at least parts of one or more of these techniques for purposes of determining a subsurface image.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving particle motion data acquired in measurements by particle motion sensors of a particle motion sensor array and rotation rate data acquired in measurements by rotation rate sensors of a rotation rate sensor array;
   characterizing a wavefield based at least in part on the particle motion data;
   characterizing a gradient of the wavefield based at least in part on the rotation rate data; and
   processing the particle motion and rotation rate data in a processor-based machine based at least in part on the characterization of the wavefield and the characterization of the gradient of the wavefield to construct a subsurface image.

2. The method of claim 1, wherein the processing comprises:
   attenuating at least one of a ground roll and an airwave.

3. The method of claim 1, wherein the processing comprises interpolating the wavefield at positions other than positions at which the particle motion and rotation rate data were acquired.

4. The method of claim 1, wherein the processing comprises applying an anti-aliasing filter.

5. The method of claim 1, wherein the processing comprises separating compression and shear wavefields.

6. A system comprising:
   an interface to receive particle motion data acquired in measurements by particle motion sensors of a particle motion sensor array and rotation rate data acquired in measurements by rotation rate sensors of a rotation rate sensor array; and
   a processor to:
      characterize a wavefield based at least in part on in part on the particle motion data;
      characterize a gradient of the wavefield based at least in part on the rotation rate data; and
      process the particle motion data and the rotation rate data to determine a subsurface image based at least in part on the characterization of the wavefield and the characterization of the gradient of the wavefield.

7. The system of claim 6, wherein the processor attenuates at least one of a ground roll and an airwave.

8. The system of claim 7, wherein the processor interpolates the wavefield at positions other than positions at which the particle motion and rotation rate data where sampled.

9. The system of claim 7, wherein the processor applies an anti-aliasing filter.

10. The system of claim 6, wherein the processor uses the particle motion and rotation rate data to separate compression and shear wavefields.

* * * * *